Dec. 18, 1945. B. F. TERRY 2,391,044
CAMERA
Filed May 4, 1944 2 Sheets-Sheet 2
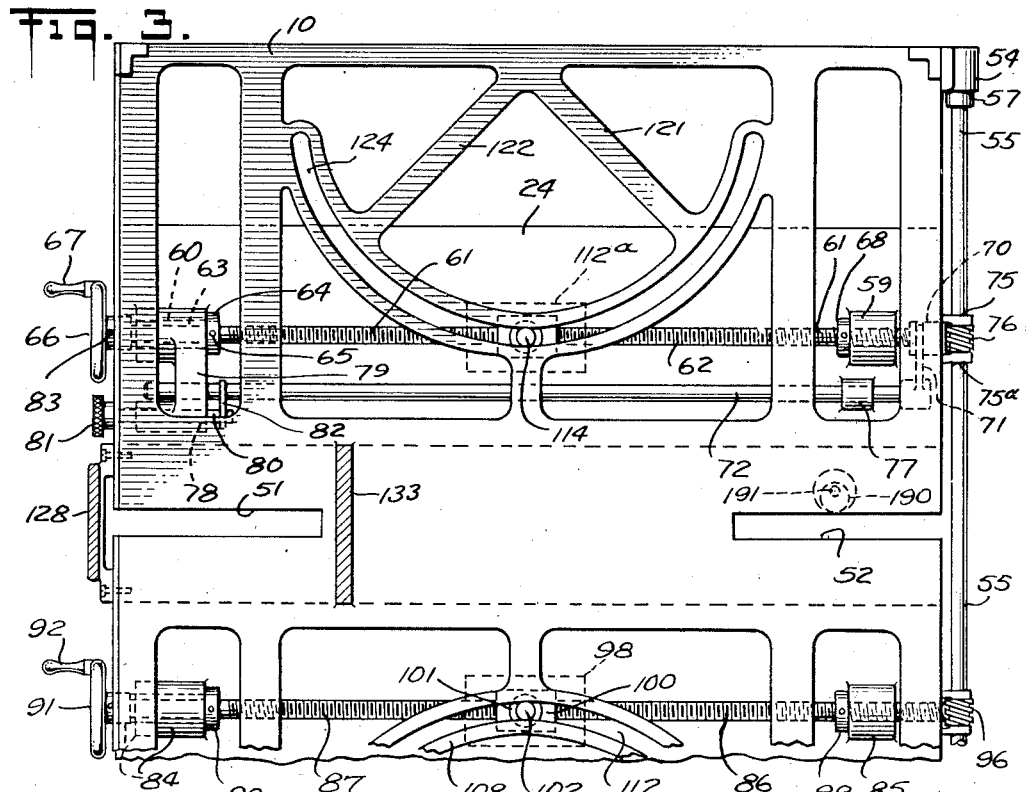
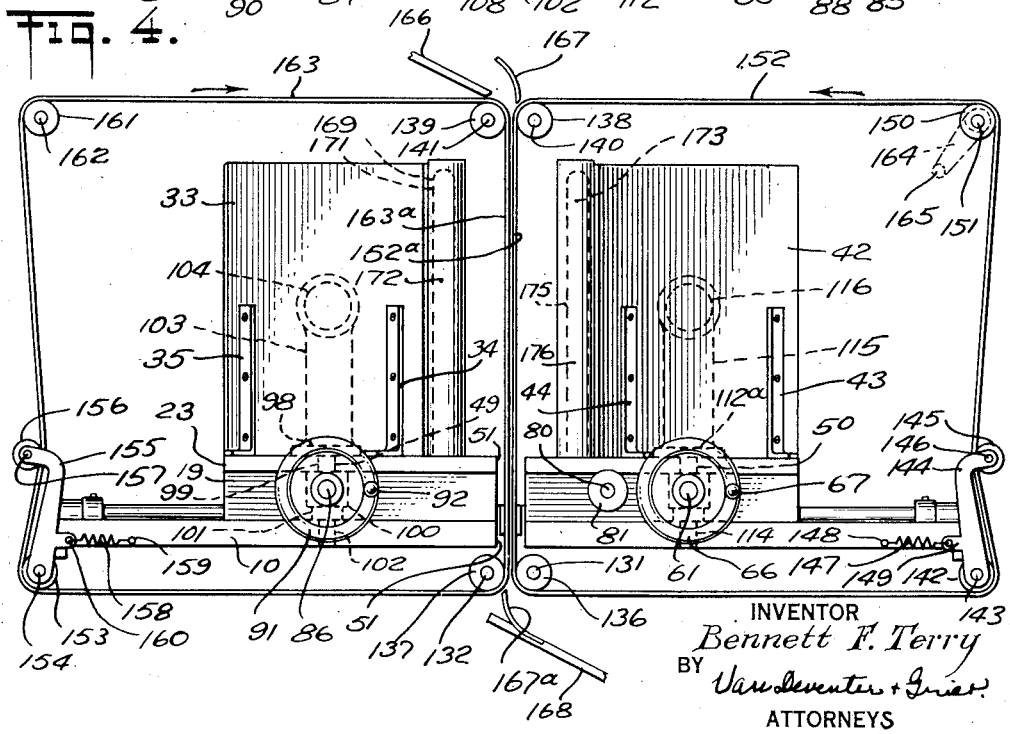
INVENTOR
Bennett F. Terry
BY
Van Deventer & Grier
ATTORNEYS Patented Dec. 18, 1945

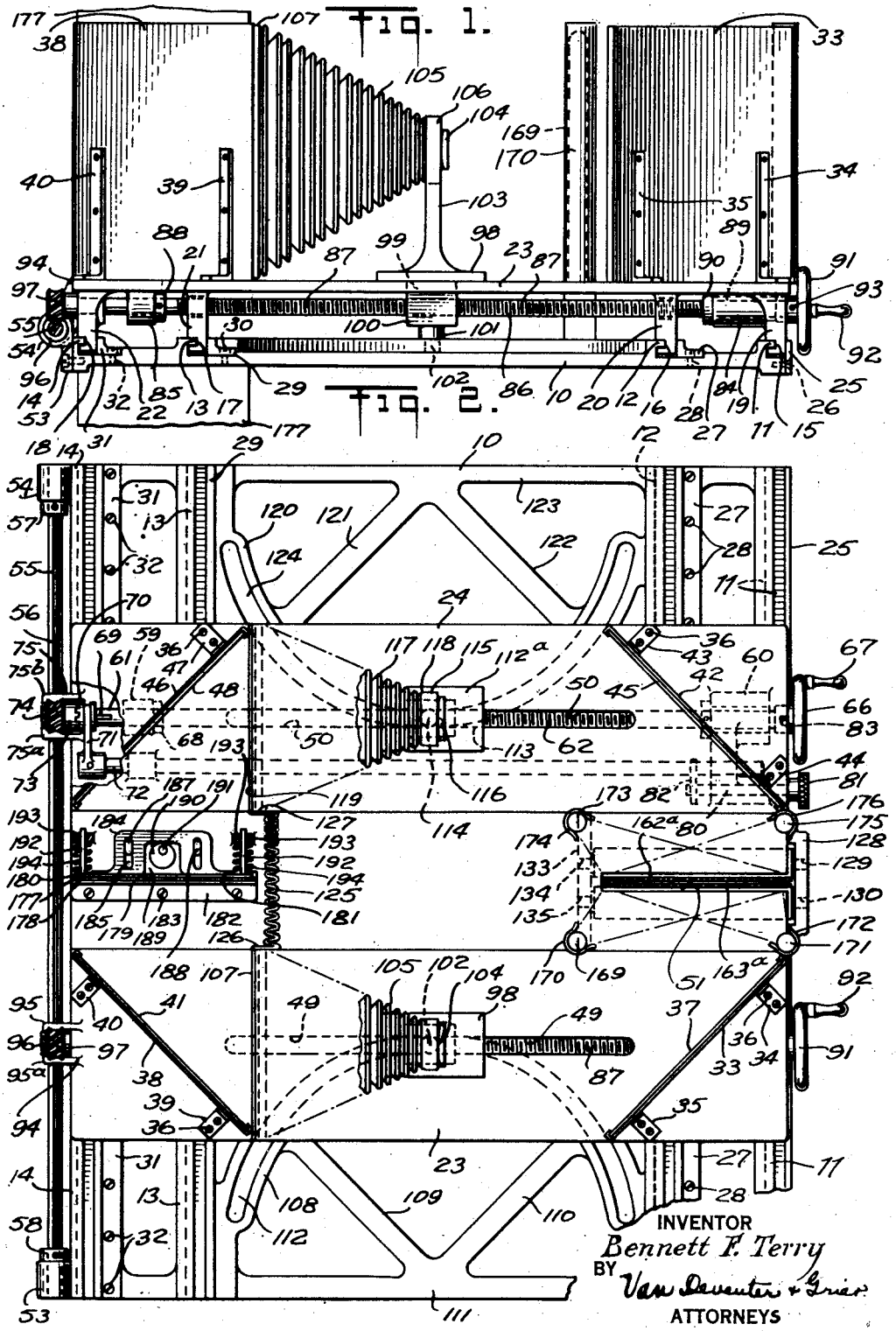

2,391,044

UNITED STATES PATENT OFFICE 2,391,044

CAMERA

Bennett F. Terry, Stamford, Conn.

Application May 4, 1944, Serial No. 534,011

11 Claims. (Cl. 88—24)

This invention relates to improvements in cameras, and has for an object the provision of a camera adapted to photograph both sides of sheets of material, carrying matter to be copied, on both sides of a member carrying a photographic emulsion on each face thereof.

Another object of the invention is the provision in a camera, of a mirror carriage carrying mirrors angularly disposed to each other with a lens therebetween, means for moving said carriage and the mirrors mounted thereon with respect to a sheet to be copied and a sheet or web carrying a photographic emulsion, said means including means for moving the lens with respect to said mirrors.

A further object of the invention is the provision in a camera, of a station for sheets or the like bearing material to be copied and a station for a double-faced emulsion-bearing sheet, said stations being in alignment with each other, duplicate mirror carriages having their axes parallel to the aligned stations and each carrying mirrors angularly-disposed with respect to its longitudinal axis, one mirror on each carriage being adapted to reflect the image of matter in said first station toward a cooperative second mirror, and each second mirror also being angularly disposed with respect to said second station, a lens on each carriage positioned between the mirrors thereon and movable therebetween, and means for moving said mirror carriages toward or away from said stations in parallelism therewith, and means for moving each lens toward one of its cooperative mirrors for reproducing enlarged images, and toward its other cooperative mirror for reproducing reduced images.

Yet another object of the invention is the provision in a camera of a base having a pair of mirror-carrying carriages mounted thereon, a copy station intermediate said carriages and in alignment with the mirrors on adjacent ends of said carriages, a station for supporting the sensitive emulsion in axial alignment with said first station and lying within the fields of the mirrors on the opposite ends of said carriages, a lens on each carriage and having its axis parallel to its carriage and cutting the mirrors thereon, and means for conjointly moving said mirror carriages along said base and for moving said lenses thereon between said mirrors.

A further object of the invention is the provision of lenses and mirror carriages which may be moved independently of each other, thereby permitting enlargements and/or reductions to be made in either side without any interference from the other side.

In order to illustrate the invention, one embodiment of the device is herein described and illustrated in the accompanying drawings in which:

Fig. 1 is an end elevation of a camera embodying my improvements;

Fig. 2 is a plan view of the new and improved camera having portions broken away for the sake of clarity;

Fig. 3 is a view similar to Fig. 2, except taken from below, and showing details of the base of the camera;

Fig. 4 is a side elevation as seen from the right hand side of Fig. 2 showing details of document-feeding belts for moving the documents into the field of the camera, certain parts and supports having been omitted for the sake of clarity.

Referring first to Figs. 1 and 2, the camera has a main base 10 having longitudinal and parallel tongues 11, 12, 13, and 14. These tongues are preferably formed integral with the base 10 and they are engaged by and cooperate with corresponding grooves 15, 16, 17, and 18 formed in lugs 19, 20, 21 and 22, respectively. The lugs 19 to 22 inclusive are preferably formed integral with a plate 23, which forms a mirror carriage, and there are on each mirror carriage a pair of lugs 19 in spaced relation to each other, a pair of lugs 20 in a spaced relation to each other, a pair of lugs 21 in spaced relation to each other, and a pair of lugs 22 in spaced relation to each other.

The second mirror carriage 24 is similar to the mirror carriage 23 and it is also provided with pair of lugs 19, 20, 21, and 22 having grooves therein which respectively engage the tongues 11, 12, 13, and 14. A longitudinal plate 25 secured to the base 10 by means of screws 26 maintains the tongue 11 in cooperative relation with the grooves 15 in the several downwardly-depending lugs 19. An angle plate 27 secured to the frame 10 by screws 28 engages the several lugs 20 and maintains the proper relation between the tongue 12 and the grooves 16 in the several lugs 20. A similar angular plate 29 secured to the base 10 by screws 30 maintains engagement of the several grooves 17 with the tongue 13 and another angular plate 31 secured to the base 10 by screws 32 engages the lugs 22 and maintains the several grooves 18 in engagement with the tongue 14. The tongues 11, 12, 13, and 14 may be considered as constituting ways along which the mirror carriages 23 and 24 may be freely and yet accurately moved, because the strip 25 and the several angular strips 27, 29, and 31 may be adjusted to a point where substantially all lost motion is taken out.

The mirror carriage 23 carries a frame 33 having mounting lugs 34 and 35 secured to the carriage by means of screws 36. The frame 33 is positioned on the right end of the mirror carriage 23 as seen in Fig. 2. Mounted in the frame 33 is a surface mirror 37. On the opposite end of the mirror carriage 33 is a similar mirror frame 38 carrying lugs 39 and 40 secured to the mirror carriage by means of screws 36, and mounted in the frame 38 is a surface mirror 41. The mirror carriage 24 has mounted on the right end thereof a frame 42 by means of lugs 43 and 44 and screws 36. A surface mirror 45 is mounted in the frame 42. At the left end of the mirror carriage 24 is a frame 46 secured thereto by means of lugs, one of which is shown at 47, and screws 36. A surface mirror 48 is mounted in the frame 46. The mirrors 37 and 41 are arranged at 45° angles to the longitudinal axis of the mirror carriage 23, and likewise the mirrors 45 and 48 are arranged at 45° angles with the longitudinal axis of the mirror carriage 24. A longitudinal slot 49 is formed in the mirror carriage 23, and a similar longitudinal slot 50 is formed in the mirror carriage 24. The purpose of these longitudinal slots will presently be described.

The base 10 has a slot 51 formed therein intermediate the mid portions of the mirror carriages 23 and 24, and adjacent to the ends of the mirror carriages carrying mirrors 37 and 45. The base 10 also carries a slot 52 oppositely disposed to and in alignment with the slot 51. The purpose of the slot 51 is to permit the passage of a web or webs carrying the matter to be photographed, and the purpose of the slot 52 is to permit the passage of a sensitized web upon which opposite faces of the matter to be photographed are impressed. The base 10 has secured thereto, in spaced relation, bearing bosses 53 and 54. These bearing bosses are on the same side of the frame as the slot 52 and one bearing is positioned adjacent to the end of said side, and the other is positioned adjacent to the other end of said side. A shaft 55 is journaled in these bearings and carries a longitudinal key slot 56. A collar 57 is secured to the shaft 55 adjacent to the bearing 54, and a second collar 58 is secured to the shaft adjacent to the bearing 53. These collars are so set that end play in the shaft 55 is eliminated. The mirror carriage 24 carries a bearing boss 59 adjacent to one end thereof and a bearing boss 60 adjacent the other end thereof, and journaled in the bearing boss 59 is a shaft 61. The shaft 61 has threads 62 formed thereon from a point adjacent the boss 59 to the other end thereof. Mounted on the other end of the shaft 61 over the threads is a threaded bushing 63 having a shoulder 64. A pin 65 passing through the shoulder 64 and the shaft 61 secures the bushing to the shaft. The bushing 63 is journaled in the boss 60. Threadedly secured on the outer end of the shaft 62 is a hand wheel 66 having a handle 67. A taper pin 83 passing through the hub and the shaft 62 keys them together. A collar 68 is secured to the shaft 61 and contacts the end of the bearing boss 59 to prevent end play in the shaft.

A key 69 is carried in the shaft 61 and riding the key is a clutch member 70 having a groove therein engaged by a yoke arm 71. The yoke arm is secured to a shaft 72 which will presently be described. A clutch member 73 adapted to cooperate with the clutch member 70 is freely mounted on the shaft 61, and a spiral pinion 74 is fixed to the clutch member 73.

A yoked bracket 75 is secured to the mirror carriage 24, and between the yoke arms 75a and 75b is mounted a spiral pinion 76 which carries a key engaging the keyway 56 in the shaft 55. When the clutch members 70 and 73 are engaged (as shown in Fig. 2), the act of rotating the hand wheel 66 causes the spiral pinion 74 to drive the spiral pinion 76, which is meshed therewith, thereby causing the shaft 55 to rotate.

The mirror carriage carries a boss 77 adjacent to the boss 59, and a boss 78 on the other end thereof, which is tied to the boss 60 by means of a web 79. The boss 77 carries a reamed hole which accommodates the shaft 72 above referred to, and the other end of the shaft 72 is mounted in a reamed hole in the web 79. The boss 78 has a reamed hole therein and carries a stub shaft 80, the outer end of which carries a knurled knob 81. The inner end of the stub shaft 80 carries a yoke 82, which is also secured to the shaft 72, so that as the knob 81 is grasped and moved to the left, as seen in Fig. 3, the shaft 72 is moved longitudinally, and thereby the yoke 71 causes the clutch member 70 to slide on the keyway 69 out of engagement with the clutch member 73, with the result that the hand wheel 66 may be rotated without rotating the shaft 55.

The mirror carriage 23 has a bearing boss 84 adjacent the right end thereof, as seen in Figs. 1 and 2, and a bearing boss 85 adjacent the other end thereof. A shaft 86 is threaded from a point adjacent to the boss 85 to the right end thereof, the threads being indicated by the numeral 87. The left end of the shaft 86 is journaled in the boss 85, and the collar 88 is carried on the shaft in contact with the bearing boss 85 to eliminate end play. A threaded bushing 89 having a flange 90 is threaded on to the shaft 86 and is journaled in the boss 84. A hand wheel 91 provided with a handle 92 threadedly engages the end of the shaft 86, and a taper pin 93, passing through the hub of the hand wheel and the shaft 86 keys them together. A yoked bracket 94 may be secured to the mirror carriage 23, and between the yoke arms 95 and 95a, is mounted a spiral pinion 96 which carries a key engaging the keyway 56 in the shaft 55. A second spiral pinion 97 is keyed on the shaft 86 and meshes with the pinion 96 so that, as the hand wheel 91 is rotated, the pinion 97 rotated therewith, drives the pinion 96 and, due to the key therein engaging the keyway 56, the shaft 55 is rotated.

A base 98 mounted on the mirror carriage 23 has a downwardly-depending tongue 99 which forms a working fit in the longitudinal slot 49. Also depending from the base 98 is a boss 100 having a horizontally threaded hole formed therein, the threads of which engage the threads 87. Depending from the boss 100 is a vertical boss having a step 101 and a smaller step 102. The purpose of the latter step will be presently described. Extending upwardly from the base 98 is a support 103 upon which is mounted a lens 104. The axis of the lens 104 is parallel to the longitudinal slot 49 and cuts the mirrors 37 and 41 at mid points thereon. A light-excluding bellows 105 has one end thereof connected to the lens support 106 (which supports the lens 104), and the other end of this bellows is connected to a frame 107 supported on the mirror carriage adjacent to the right edge of the mirror 41, as seen in Figs. 1 and 2.

Preferably formed integral with the base 10 is a curved web 108 suitably braced by radial webs 109 and 110 and a straight web 111.

Formed in the web 108 is a curved slot 112. This slot is in the form of a quadratic curve where $$X = 1/2f\left(M - \frac{1}{M}\right)$$
$$Y = 1/2f\left(M + \frac{1}{M}\right)$$

Where $f$ equals equivalent focus of lens, linear magnification equals $$M = \frac{\text{Image size}}{\text{Object size}}$$

X being the distance the lens moves from median plane, and Y the distance of movement of the mirror carriage with respect to the image and object. In Y an arbitrary constant may be added to represent arbitrary arrangement of apparatus.

The step 102 of the boss 101 forms a working fit with the walls of the slot 112. Normally this boss is positioned midway between the extremities of the curved slot when the lens 104 is half way between the mirrors 37 and 41 and these mirrors are nearest to the object and the image, which will respectively pass through the slots 51 and 52, as will be presently described.

Now, viewing Figs. 1 and 2, it will be noted that as the hand wheel 91 is rotated in a clockwise direction (as viewed from the front end of the wheel), the lens 104 will be moved to the right. When the lens 104 first starts to move, there will be practically no movement of the carriage, but as the movement of the lens 104 is continued to the right, the mirror carriage 23 begins to move away from its position nearest the object and the image, and when a point is reached where the lens has moved its maximum distance to the right, the carriage 23 has, by that time, moved its maximum distance from the image and the object. This would be the position for greatest enlargement of the image being recorded.

If instead of turning the hand wheel clockwise, it were turned counter-clockwise, the lens 104 would be moved to the left, as viewed in Figs. 1 and 2 (away from the mirror 37 and towards the mirror 41), and by the time the lens is moved its greatest distance toward the mirror 41, the mirror carriage, due to the engagement of the boss 102 with the slot 112, is again moved its greatest distance away from the object and the image. And since the distance between the lens and the object is now the greatest, this would be the position for the greatest reduction of the image.

A base 112a mounted on the mirror carriage 24 has a downwardly-depending tongue 113 which forms a working fit in the longitudinal slot 50. Also depending from the base 98 is a boss similar to the boss 100 and having a horizontally-threaded hole therethrough, the threads of which engage the threads 62. Depending from this boss is a vertical boss having a step 114 (which is similar to the step 102 above described).

Extending upwardly from the base 112a is a support 115 upon which is mounted a lens 116. The axis of the lens 116 is parallel to the longitudinal slot 50 and cuts the mirrors 45 and 48 at mid points thereon. A light-excluding bellows 117 has one end thereof connected to the lens holder 115 (which supports the lens 116) and the other end of this bellows is connected to a frame 119 supported on the mirror carriage adjacent to the right edge of the mirror 48, as seen in Fig. 2.

Preferably formed integral with the base 10 is a curved web 120 suitably braced by radial webs 121 and 122, and a straight web 123. Formed in the web 120 is a curved slot 124 like the slot 112, above described. The slot 124 is also in the form of a quadratic curve. The boss 114 forms a working fit with the walls of the slot 124 and is normally positioned midway between the extremities of the slot 124 when the lens 116 is half way between the mirrors 45 and 48 when these mirrors are nearest the object and the image. When the lens 116 has been moved to the right, as viewed in Fig. 2, to its position nearest the mirror 45 and where the distance from the object to the lens is at a minimum, the greatest magnification will be produced and, on the other hand, when the lens 116 is closest to the mirror 48, the greatest reduction is effected.

When the clutch members 70 and 73 are engaged, the act of rotating either the hand wheel 66 or the hand wheel 91 will move both lenses longitudinally on the mirror carriages in unison, and the movement of the mirror carriages is also in unison. Now, if it is desired to move each lens independently of the other (for example in cases where different magnifications are wanted), the knob 81 is pulled outwardly to disengage the clutch members and then each lens, together with the mirror carriage can be moved independently of the other.

A bellows 105 has one end thereof secured to a frame 126 carried on the mirror carriage 23, and the other end is connected to a frame 127 carried on the mirror carriage 124. The bellows 125 is provided for excluding light from the right edge of the film or sensitized web passing through the slot 52, as will presently be described. A bracket 128, Fig. 2, is secured to the base 10 and carries holes 129 and 130 which form bearings for roller shafts 131 and 132 respectively. A second bracket 133 secured to the base 10 carries holes 134 and 135 which form bearings for the other ends of the shafts 129 and 130. Other brackets may be provided for other rollers shown in Fig. 4, but these brackets are omitted from Fig. 4 for the sake of clarity. The shafts 131 and 132 respectively carry rollers 136 and 137. In vertical alignment with the rollers 136 and 137 are rollers 138 and 139 provided respectively with shafts 140 and 141. Spaced apart from and in horizontal alignment with the roller 136 is a roller 142 having a shaft 143. Riding on the shaft 143 is a bracket 144 carrying a tightening roller 145 on a stud shaft 146. A spring 147 has one end connected to a stud 148 on the base 10, and the other end is connected to a hole 149 formed in the bracket 144. Horizontally-spaced apart from the roller 138 and vertically-spaced apart from the roller 142 is a roller 150 having a shaft 151. A transparent belt 152 spans the rollers 136, 138, 150 and 142, and is engaged and tightened by the roller 145. The portion of this belt between the rollers 136 and 138, designated by the numeral 152a, passes through the slot 51 and is substantially vertical.

Horizontally-spaced from the roller 137 is a roller 153 carried on a shaft 154. Riding the shaft 154 is a bracket 155 which carries a roller 156 on a stud shaft 157. A spring 158 has one end connected to a stud 159 on the frame 10 and the other end is connected to a hole 160 formed in the bracket 155. Spaced apart horizontally from the roller 139 and vertically from the roller 153 is a roller 161 mounted on a shaft 162.

Spanning the rollers 137, 139, 161 and 153 is a transparent belt 163, and this belt is engaged and tightened by the roller 156. The vertical portion 163a between the rollers 137 and 139 cooperate with the vertical portion 152a of the belt 152 to hold copy material flat within the focal plane of the lenses 104 and 116. When either one of the rollers is driven, the belts move in unison and all of the other rollers rotate. The rollers may be motor-driven or may be rotated by hand. In Fig. 4 is shown a crank arm 164 which is secured to the shaft 151 and is provided with a handle 165. When this handle is rotated in a counter-clockwise direction, the belt 152 moves to the left (in the direction of the arrow), and the belt 163 moves to the right (in the direction of its arrow). A suitable feed shelf 166 may be provided over which copy 167 may be fed into the space between the belt portions 152a and 163a. The copy then moves into the field of the camera and after exposure may be discharged upon a surface 168 to receive the same.

For illuminating the side of the copy facing the mirror 37, a tubular lamp 169 provided with a reflector 170 is positioned forwardly of and to one side of the copy station, and the second tubular lamp 171 provided with a reflector 172 is positioned forwardly of and to the right of the copy station. For illuminating the side of the copy facing the mirror 45, a tubular lamp 173 provided with a reflector 174 is positioned to the left of the copy station and the tubular lamp 175 with a reflector 176 is positioned to the right of the copy station.

A strip or web 177 carrying a light-sensitive emulsion in both faces thereof passes through the slot 52 in the base 10 and is held flat in the focal plane of the lenses by means of a vertical frame 178 having a transparent opening 179 formed therein, and a second vertical frame 180 having a transparent opening 181 formed therein. The frame 178 may have an angular flange 182 at the bottom thereof secured to the base 10 by means of screws 183. The frame 180 has a flanged portion 184 at the bottom thereof, and is provided with parallel slots 185 and 186 which, respectively, engage bosses 187 and 188 on the base 10. The flanged portion 184 also has a rectangular hole 189 formed therein and a cam 190 carried on a shaft 191 engages one face of the opening 189 for propelling the frame 180 away from the frame 178. A plurality of studs 192 form working fits in bosses 193 and between the bosses 193 and the frame 180 are springs 194 for urging the frame 180 toward the frame 178. The sensitized strip 177 is positioned between the frame 178 to a new position (after each photographing operation), the shaft 191 may be rotated to cause the cam 190 to move the frame 180 away from the frame 178 (against the urge of the springs 194) so that the strip may be fed to a new position without scraping the same.

Instead of using a web or strip, sheets of material sensitized on both faces may be used, in which event they may be inserted from the top, and a bottom stop guide (not shown) may be engaged by the bottom edge of the sheet. After inserting the sheet, the shaft 191 may be turned to release the frame 180, thereby allowing it to be pressed firmly against the sheet under the urge of springs 194.

Although I have herein shown and described my improved camera, and have described manual control of a number of features thereof, it is obvious that many changes may be made in the arrangements shown and described without departing from the scope of the invention, and many of the manual controls may be effected in other ways than those specifically described.

What is claimed is:

1. In a camera, a base forming a support, a station for vertically supporting a sensitized emulsion, a station for vertically supporting matter to be photographed, said stations being spaced apart from and substantially in alignment with each other on said base, a carriage substantially parallel to said stations and movable along said base from a normal position nearest said stations toward one end of said base, a longitudinal guide slot formed in said carriage, a lens support mounted on said carriage and engaging said guide slot, a lens mounted on said lens support, means operatively connected to said lens support for moving the same along said guide slot, a mirror positioned on one end of said carriage angular with respect to both said guide slot and said first station, a second mirror positioned on the opposite end of said carriage angular with respect to both said guide slot and said second station, whereby an image of matter in said second station is reflected by said second mirror and via said lens to said first mirror and thence to said sensitized surface in said first station, and means cooperating with said lens support for causing said carriage to move away from said stations when said lens support is moved toward said second mentioned mirror for producing enlarged images of said matter on said emulsion.

2. In a camera, a base forming a support, a station for vertically supporting a sensitized emulsion, a station for vertically supporting matter to be photographed, said stations being spaced apart from and substantially in alignment with each other on said base, a carriage substantially parallel to said stations and movable along said base from a normal position nearest said stations toward one end of said base, a longitudinal guide slot formed in said carriage, a lens support mounted on said carriage and engaging said guide slot, a lens mounted on said lens support, means operatively connected to said lens support for moving the same along said guide slot, a mirror positioned on one end of said carriage angular with respect to both said guide slot and said first station, a second mirror positioned on the opposite end of said carriage angular with respect to both said guide slot and said second station, whereby an image of matter in said second station is reflected by said second mirror and via said lens to said first mirror and thence to said sensitized surface in said first station, and means cooperating with said lens support for causing said carriage to move away from said stations when said lens support is moved toward said first mentioned mirror for producing reduced images of said matter on said emulsion.

3. In a camera, a base forming a support, a station for vertically supporting a sensitized emulsion, a station for vertically supporting matter to be photographed, said stations being spaced apart from and substantially in alignment with each other on said base, a carriage substantially parallel to said stations and movable along said base from a normal position nearest said stations toward one end of said base, a longitudinal guide slot formed in said carriage, a lens support mounted on said carriage and engaging said guide slot, a lens mounted on said lens support, means operatively connected to said lens support for moving the same along said guide slot, a mirror positioned on one end of said carriage angular with respect to both said guide slot and said first station, a second mirror positioned on the opposite end of said carriage angular with respect to both said guide slot and said second station, whereby an image of matter in said second station is reflected by said second mirror and via said lens to said first mirror and thence to said sensitized surface in said first station, and curved slot means formed in said base and engaging said lens support for causing said carriage to move away from said stations from its normal position adjacent said stations when said lens support is moved either towards the first mentioned mirror to produce a reduced image of said matter, or when said lens support is moved towards the second mentioned mirror for producing an enlarged image of said matter of said emulsion.

4. In a camera, a base forming a support, a station for vertically supporting a sensitized emulsion, a station for vertically supporting matter to be photographed, said stations being spaced apart from and substantially in alignment with each other on said base, a carriage substantially parallel to said stations and movable along said base from a normal position nearest said stations toward one end of said base, a longitudinal guide slot formed in said carriage, a lens support mounted on said carriage and engaging said guide slot, a lens mounted on said carriage and engaging said guide slot, a lens mounted on said lens support, a curved slot on said base and having its apex extending toward a line joining said stations, an extension on said lens support engaging and forming a working fit in said curved slot, and means operatively connected to said lens support for moving it along said guide slot between said mirrors whereby the movement of said lens support in either direction along said carriage from its normal position causes said carriage to move along said base in a direction away from said stations.

5. The invention according to claim 4 in which said curved slot is a quadratic curve in which $$X = 1/2f\left(M - \frac{1}{M}\right)$$

and $$Y = 1/2f\left(M + \frac{1}{M}\right)$$

$f$ being the equivalent focus of said lens, the linear magnification M equalling the $$\frac{\text{Image size}}{\text{Object size}}$$

X being the distance the lens moves from median plane, and Y the distance of movement of the mirror carriage relative to the image and object.

6. In a camera for photographing matter on opposite sensitized surfaces, a base forming a support, a station for said sensitized surfaces, a station for matter to be photographed, said stations being substantially in alignment with each other, a mirror carriage carried on ways on said base and positioned to one side of said stations, a second mirror carriage positioned on said base on ways to the other side of said stations, mirrors at each end of each of said carriages angular with respect to said stations, a lens and a support therefor on each of said carriages movable along axes cutting the respective mirrors on each of said carriages, means on each carriage for moving its lens support with respect to the mirrors thereon, and means partly carried on said lens supports and partly carried on said base for causing said mirror carriages to move relative to said stations in definite relation to the movement of said lens supports along said carriages.

7. In a camera for photographing matter on opposite sensitized surfaces, a base, a station on said base for supporting said surfaces vertically, a second station on said base spaced apart from and substantially in alignment with said first station for vertically supporting matter to be photographed, a series of ways on said base substantially at right angles to said stations, a mirror carriage on said ways, between said stations and one end of said base, a vertical mirror mounted on one end of said carriage angular with respect to the axis of the carriage and in alignment with one of said stations, a second vertical mirror mounted on the opposite end of said carriage angular with respect to the axis of the carriage and in alignment with the other of said stations, a guide slot formed in said carriage parallel to the axis thereof, a lens support movable along said guide slot, a lens in said support, means on said carriage for moving said lens support along said guide slot, means partly on said lens support and partly on said base for causing said carriage to move along said base parallel to said stations as said lens support is moved along said slot, a second carriage mounted on said base between said stations and the opposite end thereof, said second carriage being a duplicate of said first carriage and also including means partly on its lens support and said base for moving it along the base in the same manner aforesaid, and means for causing both said carriages to move in opposite directions along said ways.

8. In a camera for simultaneously photographing matter on opposite surfaces of a sensitized sheet, a base forming a support, a station for vertically supporting two oppositely facing sensitized emulsions, a station for vertically supporting carriers bearing matter on both surfaces thereof to be photographed, said stations being spaced apart from and substantially in alignment with each other on said base, a pair of carriages mounted on said base, one carriage being positioned to one side of said stations and the other carriage being positioned on the opposite side of said stations, a lens support longitudinally movable on the other of said carriages both of said lens supports carrying lenses, a set of mirrors positioned on said first carriage including a mirror adapted to reflect an image of the matter on one face of said carrier towards its lens and thence via a second mirror to one face of said emulsion, said second mirror carriage also carrying a set of mirrors for directing matter from the opposite face of said carrier via its lens and thence via a second mirror to the opposite sensitized surface, means for moving the lens carrier along on said first carriage and means for moving the lens on said second carriage, and means normally linking last two means together for causing said lens carriers to move in unison and adapted to be disabled to permit said lens supports to be moved independently of each other.

9. The invention, according to claim 7, in which said means for causing both said carriages to move in opposite directions along said ways, includes a shaft angular with respect to the axes of said carriages and gearing keyed to said shaft, and operatively connected to said carriages, said gear being adapted to move along said shaft with said carriages.

10. In a camera for photographing matter on opposite sensitized surfaces, a base, a station on said base for supporting said surfaces vertically, a second station on said base spaced apart from and substantially in alignment with said first station for vertically supporting matter to be photographed, a series of ways on said base substantially at right angles to said stations, a mirror carriage on said ways, between said stations and one end of said base, a vertical mirror mounted on one end of said carriage angular with respect to the axis of the carriage and in alignment with one of said stations, a second vertical mirror mounted on the opposite end of said carriage angular with respect to the axis of the carriage and in alignment with the other of said stations, a guide slot formed in said carriage parallel to the axis thereof, a lens support movable along said guide slot, a lens in said support, means on said carriage for moving said lens support along said slot, means partly on said lens support and partly on said base for causing said carriage to move along said base parallel to said stations as said lens support is moved along said slot, a second carriage mounted on said base between said stations and the opposite end thereof, said second carriage being a duplicate of said first carriage and also including means partly on its lens support and said base for moving it along the base in the same manner aforesaid, and means for causing both said carriages to move in opposite directions along said ways, clutch means being provided between at least one of the operative connections to said carriages, said clutch means being adapted to be declutched to permit an operator to move said carriages independently.

11. In a camera, a base forming a support, a station for vertically supporting a sensitized emulsion, a station for vertically supporting matter to be photographed, said stations being spaced apart from and substantially in alignment with each other on said base, a carriage substantially parallel to said stations and positioned between them and one end of said base, said carriage being movable along said base from a normal position nearest said stations toward said end of said base, a longitudinal guide slot formed in said carriage intermediate the ends thereof, a lens support mounted on said carriage and reciprocally movable in said guide slot, said lens support including a boss positioned below the surface of said carriage and having a threaded hole formed therein parallel to the axis of said slot, a lens mounted in said support, a mirror positioned on each end of said carriage, said mirrors being angularly disposed with respect to the axis of said lens, a threaded shaft journaled on said carriage below the surface thereof and having its threads operatively engaging said threaded hole, and means on said shaft for rotating the same and causing said lens support to move along said guide slot between said mirrors.

BENNETT F. TERRY.